(12) United States Patent
Zhang (10) Patent No.: US 9,735,427 B2
(45) Date of Patent: Aug. 15, 2017

(54) METHOD OF PRODUCING TRIAZINE-BASED GRAPHITIC CARBON NITRIDE FILMS

(71) Applicant: Yang Zhang, Gainesville, FL (US)

(72) Inventor: Yang Zhang, Gainesville, FL (US)

(*) Notice: Subject to any disclaimer, the term of this patent is extended or adjusted under 35 U.S.C. 154(b) by 245 days.

(21) Appl. No.: 14/620,926

(22) Filed: Feb. 12, 2015

(65) Prior Publication Data

US 2016/0240851 A1    Aug. 18, 2016

(51) Int. Cl.
| | | |
|---|---|---|
| *H01M 4/583* | (2010.01) | |
| *H01M 4/04* | (2006.01) | |
| *H01M 10/0525* | (2010.01) | |
| *H01M 4/58* | (2010.01) | |
| *C01B 21/06* | (2006.01) | |

(52) U.S. Cl.
CPC .......... *H01M 4/58* (2013.01); *C01B 21/0605* (2013.01); *H01M 4/0404* (2013.01); *H01M 4/049* (2013.01); *H01M 4/0483* (2013.01); *H01M 10/0525* (2013.01)

(58) Field of Classification Search
CPC .... H01M 4/58; H01M 4/0404; H01M 4/0483; H01M 4/049; H01M 10/0525; C01B 21/0605
USPC ...................................... 429/231.8
See application file for complete search history.

(56) References Cited

U.S. PATENT DOCUMENTS 6,302,922 B1 * 10/2001  Kanehisa ............... D06B 21/00
                                                           8/128.1

FOREIGN PATENT DOCUMENTS

CN       102614904 A  *  8/2012

OTHER PUBLICATIONS

CN 102614904 A, Machine Translation, originally published 2012, p. 1-10.*
Husein, I.F., Zhou, Y., Li, F., Allen, R.C., Chan, C., Kleiman, J.I., Gudimenko, Y., Cooper, C.V., "Synthesis of Carbon Nitride Thin Films by Vacuum Arcs", 1996, Materials Science & Engineering A, p. 10-15.*

* cited by examiner

*Primary Examiner* — Gordon R Baldwin
*Assistant Examiner* — Christina McClure
(74) *Attorney, Agent, or Firm* — Saliwanchik, Lloyd & Eisenschenk (57) ABSTRACT

Methods for fabricating triazene-based graphitic carbon nitride films are provided. A substrate can be coated with silk fibroin, submerged in the central zone of plasma, and provided with microwave power. The substrate can then be dried to give a triazene-based graphitic carbon nitride film. Methods of the subject invention can be easily scaled up to industrial levels and produce triazene-based graphitic carbon nitride films that show excellent electrical properties as anodes in lithium-ion batteries.

16 Claims, 6 Drawing Sheets

METHOD OF PRODUCING TRIAZINE-BASED GRAPHITIC CARBON NITRIDE FILMS

BACKGROUND OF INVENTION

Energy capacity limitation of lithium ion battery (LiBs) has become a bottleneck problem to the emerging field of portable digital electronic devices, moveable electronic devices, and electric vehicles. Although many efforts have been devoted to developing novel anode materials aimed at improving the performance and increasing the capacity of LIBs, including nanostructured silicon, it remains a challenging problem. Recent works have shown that nitrogen-doped graphene can have high reversible capacity and good cycling stability due to high thermal conductivity, high electrical conductivity, good chemical stability, and a high number of activated defects induced by the way the nitrogen atoms are incorporated into the sp2 hybridized carbon network. However, an efficient strategy to achieve a nitrogen-containing carbon nanomaterial with a suitable microstructure and controllable chemical environment for high performance LiBs remains elusive. Graphitic carbon nitride mainly refers to carbon nitride with a 2D layer structure similar to that of graphene. Based on the differences in how the units of the graphitic carbon nitride are constructed, there are two kinds of graphitic carbon nitrides that have been experimentally identified. One is based on triazine units ($C_3N_3$), and the other is based on heptazine units ($C_6N_7$). In 2009, Wang et al. reported that a heptazine-based graphitic carbon nitride may be a promising photocatalyst for hydrogen evolution by splitting water in visible light (Wang et al., "A metal-free polymeric photocatalyst for hydrogen production from water under visible light," *Nat. Mater.*, 2009, 8, 76-80).

Recently, Algara-Siller et al. claimed that a triazine-based graphitic carbon nitride is a 2D semiconductor with a direct bandgap of 1.6 to 2.0 eV (Algara-Siller G. et al., "Triazine-Based, Graphitic Carbon Nitride: a Two-Dimensional Semiconductor," *Angew. Chem. Int. Ed.*, 2014, 53, 1-6). Such a graphitic carbon nitride material could be of particular interest for electronic devices, such as field-effect transistors and light-emitting diodes. The synthesis method used by Algara-Siller et al. is an ionothermal interfacial reaction starting with monomer dicyandiamide. Such a method can only obtain gram-scale products and only one time, so its industrial applications and technological developments are restricted.

BRIEF SUMMARY

Embodiments of the subject invention are drawn to advantageous triazine-based graphitic carbon nitride films that can be utilized as anodes in batteries, as well as to methods of fabricating the same. A submerged microwave plasma technique (SMPT) can be used, in which microwaved plasma gas is provided over starting material(s), which can be on a substrate (optional). The starting material can be, for example, silk fibroin, which can be derived from the cocoons of the silkworm *Bombyx mori*, though embodiments are not limited thereto. The plasma gas can be nitrogen, though embodiments are not limited thereto. The fabrication methods of the subject invention can be small-scale or can be easily scaled up to industrial scale by, for example, employing a large area surface wave plasma source.

In an embodiment, a method of fabricating a triazine-based graphitic carbon nitride (TGCN) film can include: coating a substrate with a starting material; submerging the coated substrate in plasma; and providing microwave power to the plasma-submerged coated substrate. The starting material can include silk fibroin and can be, for example, a silk fibroin aqueous solution.

The TGCN films of the subject invention are excellent materials for the anode of high performance lithium ion batteries (LIBs). The TGBN films, which can be fabricated on copper foil (collector) for example, can be directly utilized as an anode for LIBs. No conductive additives or binders commonly used in current LIBs processes are needed. A cell featuring such a film anode delivers a very high specific capacity (several times higher than that of the theoretical capacity of graphite) and exhibits an excellent cycling stability.

DETAILED DISCLOSURE

Embodiments of the subject invention are drawn to advantageous triazine-based graphitic carbon nitride films that can be utilized as anodes in batteries, as well as to methods of fabricating the same. A submerged microwave plasma technique (SMPT) can be used, in which microwaved plasma gas is provided over starting material(s), which can be on a substrate (optional). The starting material can be, for example, silk fibroin, which can be derived from the cocoons of the silkworm *Bombyx mori*, though embodiments are not limited thereto. The plasma gas can be nitrogen, though embodiments are not limited thereto. The fabrication methods of the subject invention can be small-scale or can be easily scaled up to industrial scale by, for example, employing a large area surface wave plasma source.

Figure 1:
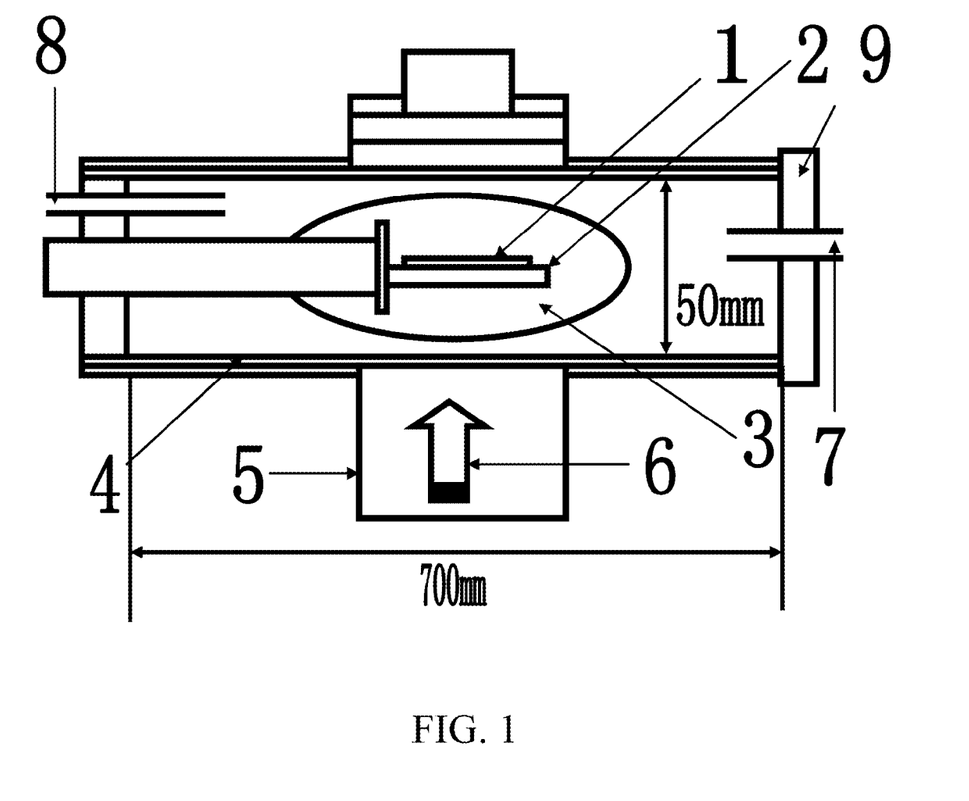
FIG. 1 shows a diagram of a system for fabricating a film according to an embodiment of the subject invention.

FIG. 1 shows a diagram of a system for fabricating a film according to an embodiment of the subject invention. Referring to FIG. 1, a substrate 1 can be disposed on a substrate stage 2 (optional) in a plasma cavity chamber 4. The substrate 1 can have the starting material(s) for the process disposed thereon. The plasma cavity chamber 4 can be, for example, a quartz tube and can have a diameter of, for example, 50 mm. Though FIG. 1 shows a width of the chamber 4 as 700 mm and a diameter or height (depending on the shape of the chamber) of 50 mm, these are for exemplary purposes only and should not be construed as limiting. The chamber 4 can have any reasonable width and diameter or height.

Microwave plasma 3 can be provided over the substrate 1 and starting material(s). The substrate 1 and starting material(s) can be at a reactor center of the microwave plasma 3. Microwave power 6 can be provided to the substrate and starting material(s). The microwave power 6 can be provided through, e.g., a wave guide 5, such as a rectangular wave guide, though embodiments are not limited thereto. In a particular embodiment, the wave guide 5 can be a WR-340 rectangular wave guide. The microwave power 6 can be provided at a set frequency (e.g., 2.45 GHz). The microwave power 6 can be provided by, e.g., an industrial magnetron and transmitted with the wave guide 5. The microwave power 6 can be introduced into the plasma cavity chamber 4 through a specially-designed coupler.

Gas can be provided into the plasma cavity chamber 4 through a gas inlet 7. Such gas can be pumped by a pump 8 of the system. The plasma cavity chamber 4 can include a loading door 9 for the substrate 1 and starting materials.

Triazene-based graphitic carbon nitride (TGCN) materials of the subject invention can be used in batteries, for example as an anode in a lithium ion battery or lithium ion secondary battery. The TGCN film nanomaterials of the subject invention can be used as anodes in batteries. TGCN nanomaterials of the subject invention have outstanding properties and can be used in many applications, including but not limited to field electron emitters, optoelectronic devices, field effect transistors, light emitting diodes, and nanoelectronic devices.

Carbon nitride has many allotropes, such as alpha-, beta-, cubic-, and graphitic carbon nitride; the graphitic carbon nitride is the most stable under ambient conditions. Graphitic carbon nitride is a two dimensional (2D) or substantially 2D material with a layered structure similar to graphite. In 1995, Teter et al. presented a crystal structure with space group P6m2 for graphitic carbon nitride by theoretical prediction (Teter, M. et al., *Science*, 1996, 271, 53-55). Since then, many efforts have been made to synthesize this unique material, but none of them, with one exception, has yielded a well-defined material of the postulated triazine structure. The one exception is Algara-Siller et al., who claimed to have grown, for the first time, macroscopically large crystalline thin films of triazine-based, graphitic carbon nitride (TGCN) using an ionothermal, interfacial reaction starting with monomer dicyandiamide (Algara-Siller G. et al., "Triazine-Based, Graphitic Carbon Nitride: a Two-Dimensional Semiconductor," *Angew. Chem. Int. Ed.*, 2014, 53, 1-6). The Algara-Siller et al, article is hereby incorporated by reference in its entirety. Algara-Siller et al. predicted that this kind of triazine-based graphitic carbon nitride is a direct 2D semiconductor with a bandgap of 1.6-2.0 eV and should provide a new possibility for post-silicon electronic devices.

Although Algara-Siller et al. stated that an ionothermal reaction to produce TGCN was successful, the method used by Algara-Siller et al. has limitations for further practical applications. The drawbacks of the Algara-Siller et al. method for producing TGCN for industrial applications include: small quantity (gram-scale, <1 g powder); time-consuming process (e.g., 64 hours); and safety hazards because ammonia is a by-product of the polycondensation reaction and pressures in the quartz ampoule can reach up to 12 bar, meaning that special care must be taken in handling and opening the quartz ampoules. Another problem is that sample preparation and manipulation must be carried out in a dry glovebox with $N_2$ flowing due to the fact that the precursors used are sensitive to air and moisture.

According to many embodiments of the subject invention, silk fibroin is utilized as a starting material for preparation of TGCN. The silk fibroin can be derived from the cocoons of the silkworm. *Bombyx mori*. The silk fibroin can be used in a water solution, for example a water solution having a concentration of less than 10% (wt %) silk fibroin. In a particular embodiment, a water solution having a silk fibroin concentration of 6.57% wt %) or about 6.57% (wt %) can be used.

Silk fibroin can include an abundance of natural protein and can be derived from the cocoons of the silkworm *Bombyx mori*. The silk fibroin protein poly-macromolecules can be transformed into TGCN by a SMPT treatment. Such nanostructured TGCN films, when used as anodes, show excellent electrochemical performance. A TGCN film on copper foil (collector) with a thickness of about 1 micrometer can be used as an anode without conductive fillers or binders for electrochemical testing of lithium ion batteries. The thickness of the active materials in the anode is about 10% of the thickness of currently-used graphite anodes.

Silk fibroin utilized as a starting material for preparation of TGCN can be used as part of a water solution, and the concentration of silk fibroin in the water solution can be, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are percentages (weight/volume)): 1, 2, 3, 4, 5, 6, 6.5, 6.55, 6.57, 6.6, 7, 8, 9, 10, 11, 12, 13, 14, 15, 16, 17, 18, 19, 20, 25, 30, 35, 40, 45, or 50.

In many embodiments, TGCN can be produced through a submerged microwave plasma technique SMPT. The sample can be located in plasma, for example in a central zone of plasma. Process conditions (e.g., microwave power, reaction pressure, duration, nitrogen gas flow rate) can be set and TGCN can be obtained. Based at least in part on the process conditions (e.g., microwave power, reaction pressure, duration, nitrogen gas flow rate), TGCN that is suitable for characterization and lithium ion battery testing can be obtained. The process conditions (e.g., microwave power, reaction pressure, duration, nitrogen gas flow rate) can be optimized. For example, the TGCN film produced in Example 1 below shows excellent electrical characteristics. The TGCN product can be shiny, black films.

The TGCN can be very small. In an embodiment, the maximum diameter of the TGCN product can be 40 mm. The maximum diameter of the TGCN product can be, for example, any of the following values, about any of the following values, at least any of the following values, at least about any of the following values, not more than any of the following values, not more than about any of the following values, or within any range having any of the following values as endpoints (with or without "about" in front of one or both of the endpoints), though embodiments are not limited thereto (all numerical values are percentages millimeters): 0.0001, 0.001, 0.01, 0.1, 1, 2, 3, 4, 5, 6, 7, 8, 9, 10, 15, 20, 25, 30, 35, 36, 37, 38, 39, 40, 41, 42, 43, 44, 45, or 50.

In an embodiment, the substrate used in the production of TGCN is a metal substrate. The substrate can include one or more of copper (Cu), titanium (Ti), nickel (Ni), iron (Fe), tantalum (Ta), aluminum (Al), or stainless steel, though embodiments are not limited thereto. In an alternative embodiment, the substrate can be an insulator (e.g., quartz). In a further embodiment.

In many embodiments, a method for the production of TGCN can include substrate clearing, starting material coating, and plasma treating. The starting material can be, for example, silk fibroin. The silk fibroin can be derived from the cocoons of the silkworm *Bombyx mori* and can be used in a water solution, for example a water solution having a concentration of less than 10% silk fibroin. The starting material (e.g., silk fibroin) can be coated by, for example, dipping or spin coating.

Embodiments of the subject invention advantageously provide a starting material for producing TGCN (e.g., TGCN films). The starting material can be silk fibroin, macromolecular containing carbon and nitrogen components, as well as an abundance of natural protein derived from the cocoons of the silkworm *Bombyx mori*. TGCNs of the subject invention can be used as an electrode (e.g., an anode) in a lithium ion battery and can have an ultra-high specific energy capacity and excellent stability.

Methods of the present invention can be easily scaled-up to industrial levels for lithium ion battery anode production in industrial applications.

Embodiments of the subject invention provide novel graphitic carbon nitride materials derived from natural silk protein with unique nanostructure by using an easily learned and repeated method. The method for producing TGCN is a submerged microwave plasma technique (SMPT). The TGCN films according to the present invention can function as anodes with high energy density for lithium ion storage and excellent stability.

A greater understanding of the present invention and of its many advantages may be had from the following examples, given by way of illustration. The following examples are illustrative of some of the methods, applications, embodiments and variants of the present invention. They are, of course, not to be considered as limiting the invention. Numerous changes and modifications can be made with respect to the invention.

Example 1

A silk fibroin solution was prepared as follows: silk fibroin powder (average diameter: ~2 micrometer) was dissolved in a 9.3 M LiBr (Sigma-Aldrich, ≥99%) aqueous solution at 60° C. for 4 hours yielding a 20% (w/v) solution. Then the solution was dialyzed in water using Slide-a-Lyzer dialysis cassettes (Pierce, MWCO 3500) for 48 hours. The final concentration of the aqueous silk fibroin solution obtained was 6.57 wt %.

A substrate (copper foil and quartz) was coated using the silk fibroin solution by dipping or spin coating. The substrate was placed in a petri dish for over 24 hours for natural drying. Before the sample was treated, the surface of the sample was covered by a stainless steel disk of the size same as the substrate (diameter: 14 mm). On the opposite edge of the copper substrate, two stainless steel screws were used for tightening. Then, the dried Silk fibroin coated copper sample was put in a plasma reactor center for following plasma treatment. The conditions for treating the sample were: microwave power 700-850 W, pressure 10-15 Torr, duration time 10-30 min., nitrogen flow rate 30-50 standard cubic centimeters per minute (sccm). No additional substrate heater was employed; the sample was heated by the plasma self-heating. After about 10-30 minutes, the microwave supply was turned off, and the sample was cooled to room temperature under flowing nitrogen with a flow rate of 30-50 sccm while keeping a vacuum pressure of 10-15 Torr. The result was triazene-based graphitic carbon nitride in the form of shiny, black films.

Example 2

Figure 2:
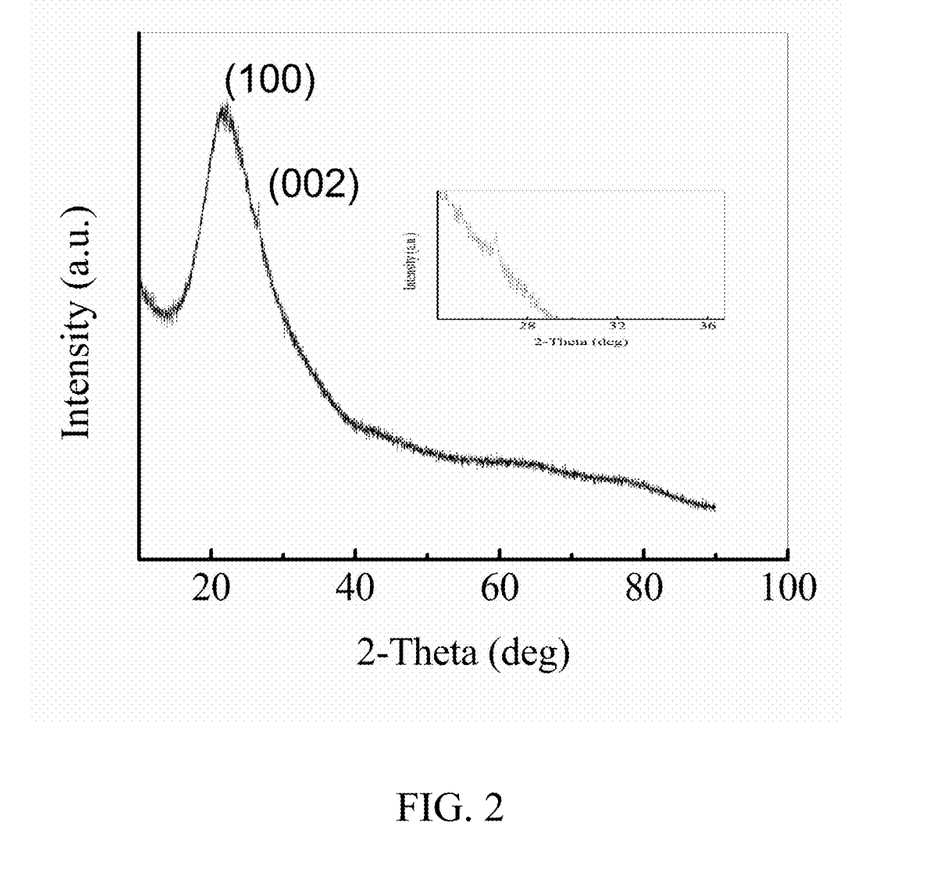
FIG. 2 shows a plot of XRD intensity versus 2-theta.

X-ray diffraction (XRD) was used on the triazene-based graphitic carbon nitride (TGCN) produced in Example 1. XRD can be used as a direct tool to identify the crystal structure of the TGCN. FIG. 2 shows the XRD pattern of the TGCN produced in Example 1. Referring to FIG. 2, the XRD pattern shows two peaks centered at 20.78 degrees and 26.5 degrees, with corresponding d values of 0.43 nm and 0.336 nm, respectively. These peaks were assigned to the (100) plane and (002) plane diffractions of the TGCN crystal, which matches well the theoretical prediction for triazine-based graphitic carbon nitride crystal (P6m2 space group (no. 187)). The insert in FIG. 2 is an enlarged diffraction peak assigned to the (002) plane.

Figure 3:
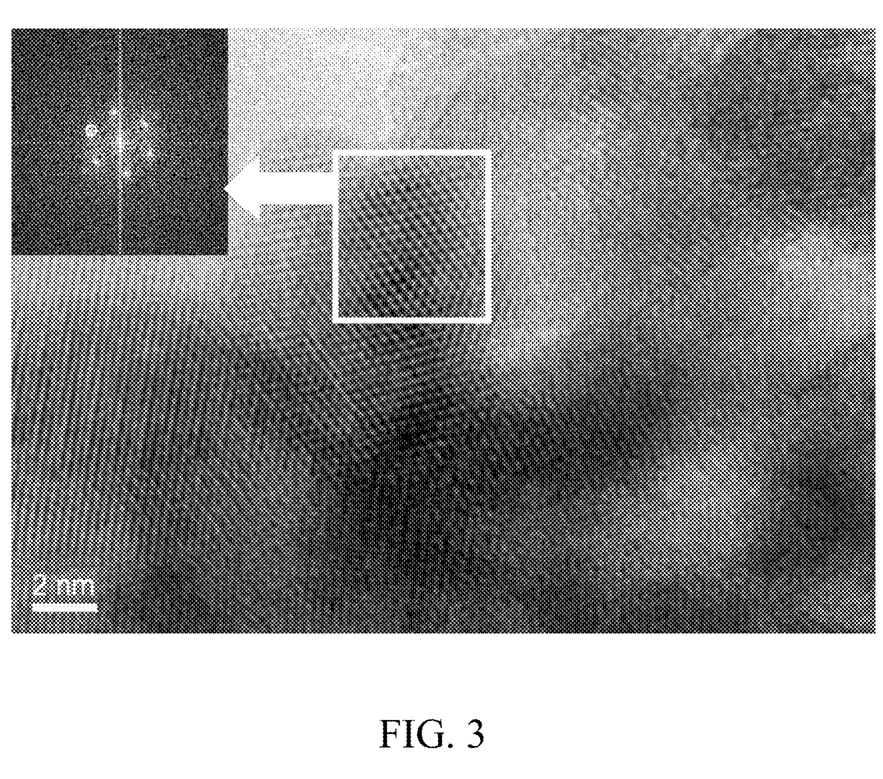
FIG. 3 shows a transmission electron microscope image of a film according to an embodiment of the subject invention.

High-resolution transmission electron microscope (HR-TEM) images gave further confirmation that the substance produced in Example 1 was TGCN. FIG. 3 shows HRTEM images of the TGCN produced in Example 1. Referring to FIG. 3, the HRTEM images show a hexagonal 2D honeycomb arrangement with a unit-cell of 0.26 nm. The positions of the three coordinated nitrogen atoms of a triazine-based lattice show up as bright areas. The insert in FIG. 3, at the upper, left-hand side, is the corresponding Fourier transform image, showing the electron diffraction pattern of the lattice planes corresponding to the (002) plane with hexagonal symmetry.

Figure 4:
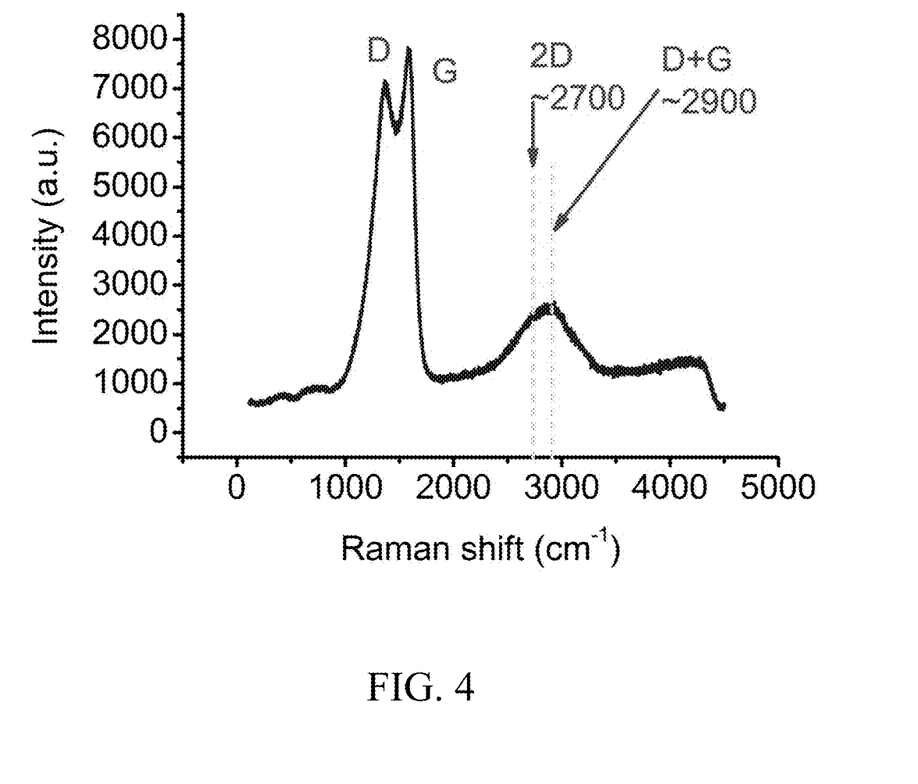
FIG. 4 shows a plot of intensity versus Raman shift for a film according to an embodiment of the subject invention.

FIG. 4 shows the Raman scattering spectrum of the TGCN film produced in Example 1. The Raman spectroscopy provides further evidence that the film was graphitic carbon nitride with a well-defined crystalline graphene structure. From specific vibration modes shown in the Raman scattering spectrum of the graphitic carbon nitride film, structural characteristics of graphitic carbon nitrides can be identified. The Raman spectrum of the fabricated TGCN film from Example 1 displays two prominent peaks of the D band and G band centered at 1360 $cm^{-1}$ and 1593 $cm^{-1}$ as well as a weak and broadened band centered at 2848 $cm^{-1}$ (originated from overlapping of about 2700 $cm^{-1}$ (2D) and about 2900 $cm^{-1}$ (D+G) two bands), which are feature characteristic of high nitrogen content carbon nitride with a layered structure like that of graphene.

According to X-ray photoelectron spectrometry (XPS) analysis, the film prepared in Example 1 was a composite film containing triazine-based graphitic carbon nitride and amorphous carbon. High resolution spectra of C1s and N1s data indicate that the sample prepared included carbon-nitride bonding with a triazine-based graphitic carbon nitride structure.

Example 3

Electrochemical testing was performed on the triazine-based graphitic carbon nitride prepared in Example 1. The electrochemical testing of the triazine-based graphitic carbon nitride prepared on a copper collector (Example 1) without using any binder or conductive additives was carried out using coin cells (CR2032) with a metallic lithium counter electrode. The Celgard (2500) membrane was used as a separator between two electrodes. The lithium salt electrolyte used for this testing was $LiPF_6$ at a concentration of 1 M dissolved in a mixture of ethylene carbonate (EC) and diethylcarbonate (DEC) (1:1 by volume). The cells were assembled and sealed in an argon-filled glove box. Charge-discharge characteristics of the cells were galvanostatically tested using a Battery Testing System in the range of 0.01-3.0 V at a constant current density of 50 mA/g. A cell featuring such a film anode delivers a very high specific capacity (several times higher than that of the theoretical capacity of graphite) and exhibits excellent cycling stability.

In order to evaluate the electrochemical properties of the triazene-based graphitic carbon nitride (TGCN) of Example 1 as an anode, galvanostatic charge-discharge measurements were carried out on the TGCN of Example 1 in the voltage range of 0.01-3 V at room temperature.

Figure 5:
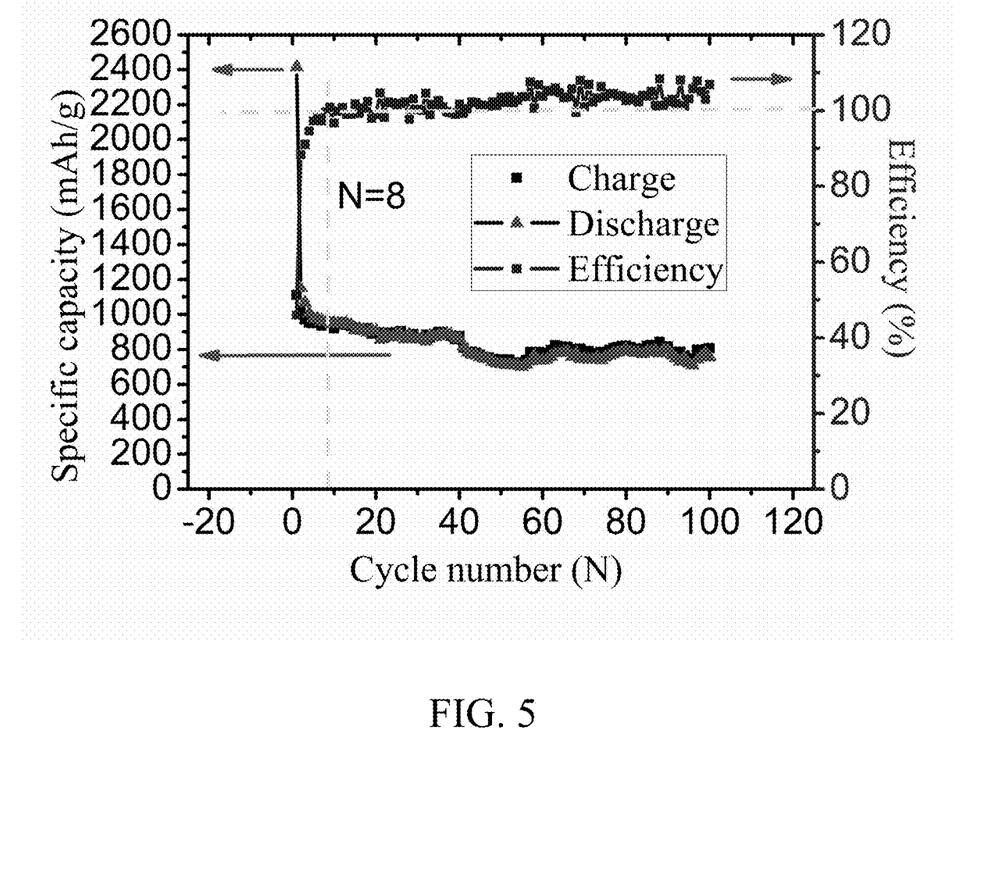
FIG. 5 shows plots of specific capacity and efficiency versus cycle number for graphitic carbon nitride.
Figure 6:
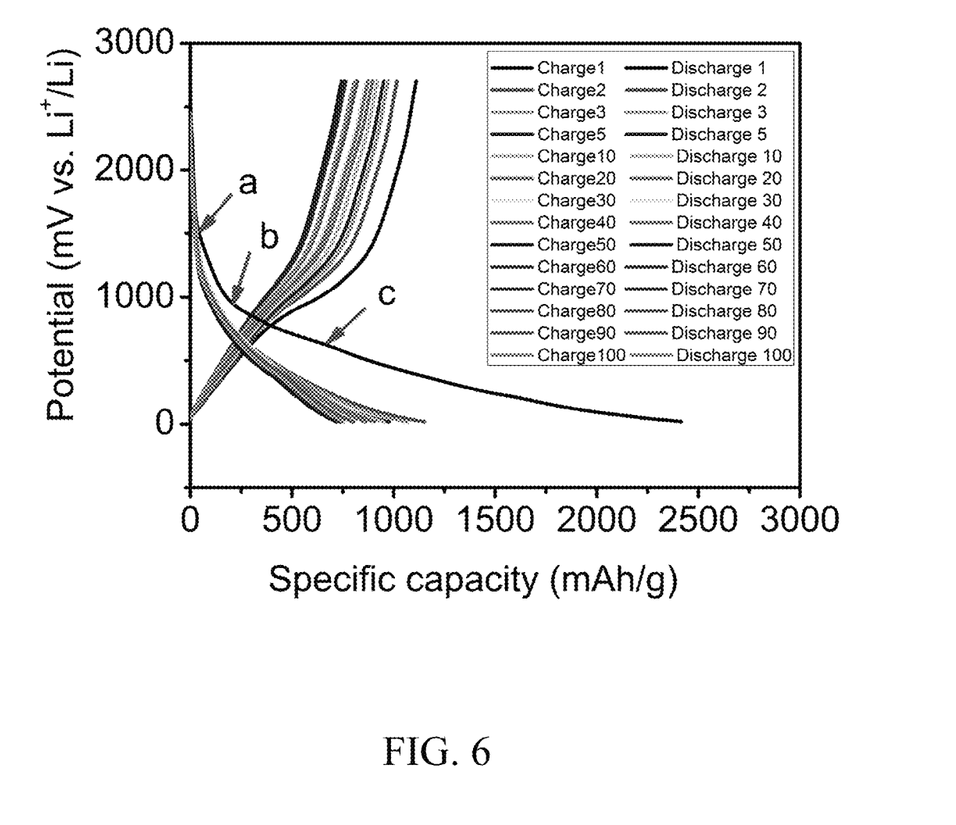
FIG. 6 shows a plot of potential versus specific capacity for graphitic carbon nitride.

FIGS. 5 and 6 show representative galvanostatic discharge-charge curves for the TGCN anode from the first to 100 discharge-charge cycles recorded at a current density of 50 mA/g. Referring to FIGS. 5 and 6, the initial discharge capacity reached 2410 mAh/g, over 6 times that of commercialized graphite anodes. The reversible capacity was 1113 mAh/g, and the coulumbic efficiency was 46% in the first cycle. The irreversible capacity is used for decomposition of electrolytes and forming solid electrolyte interphase (SEI) films in the first charge/discharge process. Although the irreversible capacity was high at about 1297 mAh/g, the efficiency reached over 90% after 3 cycles and almost 100% after 8 cycles (corresponding capacity kept at 958 mAh/g).

The reversible capacity remained at 757 mAh/g after 100 cycles, with coulumbic efficiency of 95%, revealing 74% retention of the second cycle capacity. In addition, before the 8th cycle, the discharge capacity was larger than the charge capacity in terms of the same cycling; that is, starting at the 9th cycling, the charge capacity was larger than the discharge capacity at the same charge/discharge cycle, and this trend goes through 100 cycles. The charge/discharge profile indicates that there are three stages, indicated in FIG. 6 by the "a", "b", and "c" in the first discharge process curve. These stages correspond to the different structural states in the process of SEI film forming and lithium ion interaction with matrix material. The high reversible capacity is likely due to a combination of different Li storage mechanisms.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

Algara-Siller G. et al., "Triazine-Based, Graphitic Carbon Nitride: a Two-Dimensional Semiconductor," *Angew. Chem. Int. Ed.*, 2014, 53, 1-6.

Rockwood, D. N. et al., "Materials fabrication from *Bombyx mori* silk fibroin," *Nature Protocols*, 6(2011)1612-1631.

Teter, M. et al., *Science*, 1996, 271, 53-55.

Wang, X. C. et al., "A metal-free polymeric photocatalyst for hydrogen production from water under visible light," *Nat. Mater.*, 2009, 8, 76-80.

What is claimed is:

1. A method of fabricating a triazine-based graphitic carbon nitride (TGCN) film, the method comprising:
    coating a substrate with a starting material;
    submerging the coated substrate in plasma; and
    providing microwave power to the plasma-submerged coated substrate,
    wherein the starting material comprises silk fibroin.

2. The method according to claim 1, wherein the starting material is a silk fibroin aqueous solution.

3. The method according to claim 2, wherein the silk fibroin aqueous solution has a silk fibroin concentration of less than 10% (weight/volume).

4. The method according to claim 2, wherein coating the substrate with the starting material comprises dipping the substrate in the silk fibroin aqueous solution or spin coating the silk fibroin onto the substrate.

5. The method according to claim 2, further comprising preparing the silk fibroin aqueous solution, wherein preparing the silk fibroin aqueous solution comprises:
    dissolving silk fibroin powder in a precursor aqueous solution to yield an intermediate solution; and
    dialyzing the intermediate solution to obtain the silk fibroin aqueous solution.

6. The method according to claim 5, wherein the precursor aqueous solution is a 9.3 M lithium bromide (LiBr) aqueous solution,
    wherein dissolving the silk fibroin powder in the precursor aqueous solution comprises dissolving the silk fibroin powder in the LiBr aqueous solution at 60° C. for at least four hours yielding the intermediate solution having a 20% (weight/volume) concentration of silk fibroin,
    wherein dialyzing the intermediate solution comprises dialyzing the intermediate solution in water using dialysis cassettes for at least 48 hours.

7. The method according to claim 1, wherein submerging the coated substrate in plasma comprises submerging the coated substrate in plasma such that the coated substrate is in a central zone of the plasma.

8. The method according to claim 1, wherein the substrate comprises at least one material selected from the following group: copper (Cu); titanium (Ti); nickel (Ni); iron (Fe); tantalum (Ta); aluminum (Al); stainless steel; and quartz.

9. The method according to claim 1, the substrate comprises Cu foil.

10. The method according to claim 1, further comprising covering the starting material of the coated substrate with a cover before submerging the coated substrate in plasma,
    wherein the cover is a stainless steel disk, and wherein covering the starting material of the coated substrate comprises using at least one screw to tighten the cover.

11. The method according to claim 1, wherein submerging the coated substrate in plasma comprises submerging the coated substrate in plasma within a reactor chamber, and
    wherein providing microwave power to the plasma-submerged coated substrate comprises providing microwave power to the reactor chamber having the plasma-submerged coated substrate disposed therein.

12. The method according to claim 11, further comprising:
    providing gas to the reactor chamber through a gas inlet in the reactor chamber while microwave power is provided to the plasma-submerged coated substrate; and
    drying the plasma-submerged coated substrate after microwave power is provided to the plasma-submerged coated substrate.

13. The method according to claim 1, wherein providing microwave power to the plasma-submerged coated substrate comprises providing microwave power in a range of from 700 Watts (W) to 850 W to a reactor chamber having the plasma-submerged coated substrate disposed therein for a duration of from 20 minutes to 30 minutes, while maintaining the pressure of the reactor chamber in a range of from 10 Torr to 15 Torr, wherein nitrogen gas is supplied to the reactor chamber while microwave power is provided to the plasma-submerged coated substrate, and wherein the nitrogen gas is provided at a flow rate of from 30 standard cubic centimeters per minute (sccm) to 50 sccm.

14. The method according to claim 13, further comprising drying the plasma-submerged coated substrate after providing microwave power to the plasma-submerged coated substrate, wherein drying the plasma-submerged coated substrate comprises providing flowing nitrogen at a flow rate of about 30 sccm while maintaining a pressure of from 10 Torr to 15 Torr.

15. The method according to claim 14, wherein the starting material is a silk fibroin aqueous solution having a silk fibroin concentration of less than 10% (weight/volume), wherein coating the substrate with the starting material comprises dipping the substrate in the silk fibroin aqueous solution or spin coating the silk fibroin onto the substrate, wherein the method further comprises preparing the silk fibroin aqueous solution, and wherein preparing the silk fibroin aqueous solution comprises:
dissolving silk fibroin powder in a precursor aqueous solution to yield an intermediate solution; and
dialyzing the intermediate solution to obtain the silk fibroin aqueous solution.

16. The method according to claim 15, wherein the precursor aqueous solution is a 9.3 M lithium bromide (LiBr) aqueous solution, wherein dissolving the silk fibroin powder in the precursor aqueous solution comprises dissolving the silk fibroin powder in the LiBr aqueous solution at 60° C. for at least four hours yielding the intermediate solution having a 20% (weight/volume) concentration of silk fibroin, wherein dialyzing the intermediate solution comprises dialyzing the intermediate solution in water using dialysis cassettes for at least 48 hours.

* * * * *

UNITED STATES PATENT AND TRADEMARK OFFICE
CERTIFICATE OF CORRECTION

PATENT NO. : 9,735,427 B2  
APPLICATION NO. : 14/620926  
DATED : August 15, 2017  
INVENTOR(S) : Yang Zhang Page 1 of 1

It is certified that error appears in the above-identified patent and that said Letters Patent is hereby corrected as shown below:

In the Specification

Column 2,
Lines 18-19, "BRIEF DESCRIPTION OF THE DRAWINGS" should read --BRIEF DESCRIPTION OF THE DRAWINGS
The patent or application file contains at least one drawing executed in color. Copies of this patent or patent application publication with color drawings will be provided by the Patent Office upon request and payment of the necessary fee.--.

Column 2, Line 67 – Column 3, Line 1,
"substrate and
starting" should read --substrate and starting--.

Column 3,
Line 65, "silkworm. *Bombyx*" should read --silkworm *Bombyx*--.

Column 4,
Line 2, "6.57% wt %)" should read --6.57% (wt %)--.

In the Claims

Column 7,
Line 64, "coated substrate," should read --coated substrate, thereby forming a TGCN film;--.

Signed and Sealed this
Fourth Day of September, 2018

Andrei Iancu
*Director of the United States Patent and Trademark Office*